US00RE35300E

United States Patent [19]

Bakharev

[11] E Patent Number: Re. 35,300

[45] Reissued Date of Patent: Jul. 23, 1996

[54] DEVICE FOR SEPARATING MULTIPLE-COMPONENT FLUIDS

[75] Inventor: Iouri Bakharev, Belorechensk, Russian Federation

[73] Assignee: EPR Inc., West Springfield, Mass.

[21] Appl. No.: 232,707

[22] Filed: Apr. 25, 1994

Related U.S. Patent Documents

Reissue of:

[64] Patent No.: 5,221,305
Issued: Jun. 22, 1993
Appl. No.: 932,768
Filed: Aug. 20, 1992

[30] Foreign Application Priority Data

Dec. 11, 1991 [RU] Russian Federation ..... 5013294

[51] Int. Cl.[6] ..... B01D 45/00

[52] U.S. Cl. ..... 55/442; 55/DIG. 37

[58] Field of Search ..... 55/442, 443, DIG. 37

[56] References Cited

U.S. PATENT DOCUMENTS

| | | | |
|---|---|---|---|
| 2,034,467 | 3/1936 | Haber | 183/75 |
| 2,571,331 | 10/1951 | Blomen | 183/113 |
| 2,874,800 | 2/1959 | Fan Der Kolk | 183/44 |
| 3,155,474 | 11/1964 | Sexton | 55/442 |
| 3,599,398 | 8/1971 | Jaeger et al. | 55/84 |
| 3,958,966 | 5/1976 | Keller | 55/442 |
| 4,123,241 | 10/1978 | Maden | 55/442 |
| 4,198,220 | 4/1980 | Keller | 55/442 |
| 4,340,474 | 7/1982 | Johnston | 210/199 |
| 4,500,332 | 2/1985 | Gillingham | 55/443 |

FOREIGN PATENT DOCUMENTS

| | | |
|---|---|---|
| 388637 | 6/1932 | United Kingdom . |
| 766279 | 8/1954 | United Kingdom . |

*Primary Examiner*—C. Scott Bushey
*Attorney, Agent, or Firm*—Norbert P. Holler; Gottlieb, Rackman & Reisman

[57] ABSTRACT

A device for separating multiple-component fluids includes a truncated cone structure having a conical main section defined by a plurality of coaxially aligned and axially spaced rings of progressively diminishing inner diameters as viewed in the direction of movement of the fluids being separated. The largest ring is located at that end of the conical main section at which the fluid is admitted thereto, and the smallest ring is located at that end of the conical main section at which separated solid particles are discharged. Each ring has an inside surface which is convexly curved in a radial cross-section along the axis of the cone structure and faces in part counter to and in part across the direction of fluid flow. The inside surface of each ring meets the bottom surface of that ring in a sharp edge, with the tangent to the bottom surface at that juncture making an angle of at most 90° with respect to the direction of fluid flow, and with the tangent to the inside surface at that juncture being substantially parallel to the axis of the cone structure. The arrangement of the rings causes the solid particles to be concentrated in the axial region of the cone structure for axial discharge therefrom while cleaned fluid exits from the cone structure through the gaps between the rings.

20 Claims, 8 Drawing Sheets

FIG. 1B
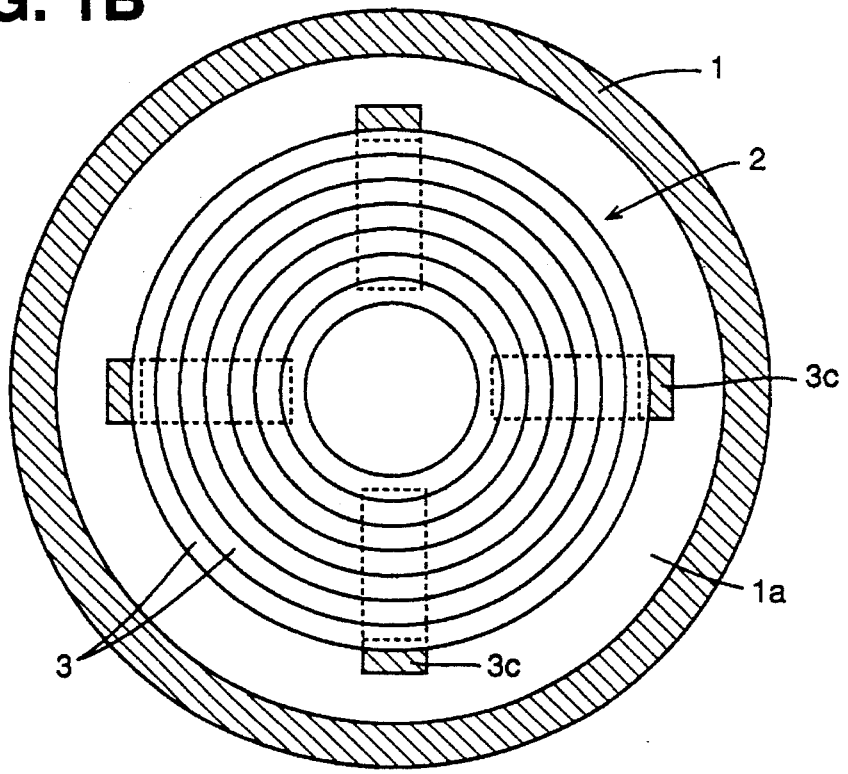
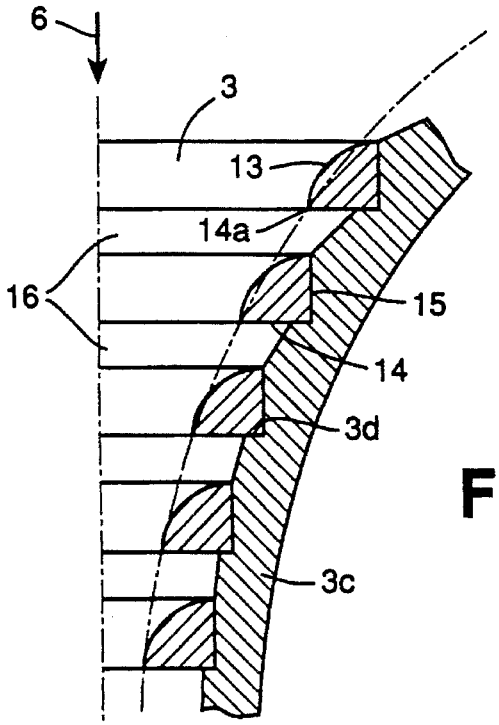
FIG. 1C

DEVICE FOR SEPARATING MULTIPLE-COMPONENT FLUIDS

Matter enclosed in heavy brackets [ ] appears in the original patent but forms no part of this reissue specification; matter printed in italics indicates the additions made by reissue.

FIELD OF THE INVENTION

This invention relates to devices separating multiple-component fluids and, in particular, to devices for separating and cleaning gases from solid particles such as grit, dust, fume, smoke and other mechanical admixtures.

BACKGROUND OF THE INVENTION

Known in the art are various devices for separating and cleaning gas flows from solid particles, e.g. from dust, such as: settling chambers, in which the largest solid particles (grit) settle by gravity; cyclones and inertial dust separators, which make use of centrifugal and inertial effects arising from changes in the direction of the gas flow; industrial filters (also known as "bag houses"), in which the dust-laden gas passes through cloth, layers of paper, glass wool, metal meshes, etc.; electrostatic precipitators (electro-filters) in which the particles are electrically charged in a high-voltage electric field and then drift to an electrode on which they settle; and other devices, such as wet scrubbers, in which the dust particles are brought in contact with a liquid and subsequently swept away.

When no particular system can provide the required degree of cleaning, equipment operating on more than one of the above approaches may be used (e.g., a cyclone separator may be combined with a fabric filter).

One of the main characteristics of a dust separator is its gravimetric cleaning efficiency $\eta$, which is commonly defined as the ratio of the weight of dust trapped to the weight of incoming dust (in the same period of time). The cleaning efficiency can be expressed either as a number $\eta \leqq 1$ (as, for the most part, will be done below) or, upon multiplication by 100, in percent.

A more detailed characterization of a dust-separating device is provided by the fractional efficiency, which is an indication of the variation of gravimetric efficiency as a function of the particle size d. The fractional efficiency may be expressed as a formula or a curve $\eta(d)$ which shows gravimetric efficiency in a continuous series of narrow ranges of the particle size spectrum (W. Strauss, "Industrial Gas Cleaning" Pergamon Press, 1966)

Generally speaking, the smaller the particles, the more difficult is the task of their separation. Correspondingly, the fractional efficiency curves $\eta(d)$ are not constant across the particle size range, but tend to rapidly fall off for smaller particle sizes, approaching zero efficiency as the particle size tends to zero. Thus, in characterizing various dust-separating devices, the question of importance is below which particle size the fractional efficiency starts to decrease appreciably. For example, for a typical gravity settling chamber, the fractional efficiency curve starts to decrease around the 80–100 μm range, and may reach $\eta=0.8$ (80%) efficiency around 50 μm (Strauss, supra).

Taking, somewhat arbitrarily, a cleaning efficiency of 80% as the reasonable criterion dividing the more useful devices ($\eta>80\%$) from the less useful ones ($\eta<80\%$), it is found that only electro-filters, cloth filters, certain types of wet scrubbers, and special small-radius cyclones can separate particles less than 10 μm in size with $\eta \geqq 80\%$ (Strauss, supra; "High-Efficiency Air Filtration", edited by P. A. F. White and S. E. Smith, Butterworths, London, 1964).

Another parameter which may affect the cleaning efficiency of a device is the dust concentration or dust density in the gas, measured in $g/m^3$, at the input of the device.

Yet another important parameter associated with the operation of a dust-separating device and having an impact on its cleaning efficiency is the average gas velocity through the device. The existing dust-separating devices operate at different gas velocities, depending on the principle of their operation. For example, while electro-filters operate at a relatively low gas velocity seldom exceeding 2 m/s, inertial dust separators work at speeds between 15 and 30 m/s. The higher velocities are generally desirable, since they imply higher throughput of a device (the latter being the product of a gas flow velocity and the cross-sectional area of the gas flow through the device). For a given required throughput, the higher the allowed gas velocity, the smaller can be the size of the device.

However, as the gas velocity exceeds a certain optimum value (which depends on the type of device being used), the cleaning efficiency starts to drop, sometimes abruptly. For example, in inertial separators this drop in the cleaning efficiency occurs due to a set up of strong turbulence in a gas flow at speeds over 30 m/s. At the same time, by virtue of their nature, the inertial separators also lose their cleaning efficiency at low gas velocities. In real devices of this type, the useful range of gas velocities is typically rather narrow, e.g. ±20% of the optimum velocity value at which $\eta$ is maximum.

When two or more (in general, n) devices, which individually have cleaning efficiencies $\eta_1, \eta_2, \ldots, \eta_n$, are connected in series, so that the cleaned gas from an upstream device enters the next downstream device, it is straightforward to show that the total cleaning efficiency of n devices in series can be expressed as $$E=\eta_1+(1-\eta_1)\eta_2+(1-\eta_1)(1-\eta_2)\eta_3+\ldots+(1-\eta_1)(1-\eta_2)\ldots(1-\eta_{n-1})\eta_n \quad (1)$$

with $\eta$ being expressed as a number smaller than unity rather than in percent. For example, for two separators with individual efficiencies $\eta_1$ and $\eta_2$ connected in series, $$E=\eta_1+(1-\eta_1)\eta_2. \quad (2)$$

In light of what has been said about the fractional efficiency $\eta(d)$ and the dust density, it will be apparent that formulas (1) and (2) should be used with caution. Indeed, the first device of a series will tend to separate out primarily the larger particles and to supply the next downstream device with the partially cleaned gas which will have both (a) a lower dust density and (b) a particle size distribution with, generally, smaller average particle size as compared to the size distribution of dust entering the first device. This shift in particle size distribution is a direct consequence of the non-constant fractional efficiency curve $\eta(d)$; it places a practical limit to the degree of particle separation from the gas flow which can be achieved by means of plural cleaning devices connected in series. Thus, the values of $\eta$ in formula (1) and (2) should be understood as corresponding to the characteristics of a dust-carrying gas flow at the inputs of each respective dust separating device. In practice these values are obtained experimentally.

In the range of particle sizes in which $\eta(d)$ does not become too small, connecting a plurality of devices in series is an effective way to increase the total cleaning efficiency of a system. For example, from formula (2), taking $\eta_1=0.7$ and $\eta_2=0.6$, it is found that E=0.88 (88%).

Clearly, devices with an essentially flat $\eta(d)$ down to small particle sizes would be especially useful for high purification of gas flows by means of connecting them in series.

As those skilled in the field of multiple-component fluid (i.e., gas/solids) separation know, the prior art includes the above-mentioned class of devices known as inertial or momentum separators, in which the the gas is cleaned of solid particles by utilizing abrupt changes in the direction of movement of the gas flow and a reduction in its velocity. The solid particles, because of their inertia, will continue to move in the same direction as the initial gas flow, and will eventually be deposited into a collecting hopper. The heavier (larger) particles have more inertia and thus are cleaned with more ease than the lighter (smaller) ones, which tend to escape with the cleaned gas flow.

Some of these devices are constructed so as to provide a number of solid (typically, metal) surfaces inclined at an acute angle with respect to the gas flow, the aim of the surfaces being to deflect the solid particles away from their paths which originally coincide with the direction of the main gas flow. The surfaces thus help to concentrate the solid particles on the one side of the said deflecting parts, while the cleaned gas escapes through the spaces between the deflecting parts.

Such a device is the shutter-type collector (Strauss, supra; C. J. Stairmand, Trans. Inst. Chem. Eng. (London), 29, 356 (1951)) which is sometimes used as a pre-cleaning stage before cyclones or bag houses. More efficient is the conical louvered collector and its variations (Strauss, supra; K. Hansen, Fifth World Power Conference, Vienna, 16, 5829 (1956); E. Haber, U.S. Pat. No. 2,034,467 and U.K. Pat. No. 388,637; H. Van Der Kolk, U.S. Pat. No. 2,874,800 and U.K. Pat. No. 766,279; I. R. W. Johnston, U.S. Pat. No. 4,340,474; H. Keller, U.S. Pats. No. 3,958,966 and No. 4,198,220; K.H. Maden, U.S. Pat. No. 4,123,241). In a popular version (see, for example, the Haber patents), it consists of a system of conically mounted flat-surfaced conical rings of decreasing diameters. The flat-surfaced conical rings are mounted in a cylindrical or conical casing so that they overlap each other in the axial direction leaving narrow gaps between adjacent ring surfaces. These annular gaps are oriented at a sharp angle with respect to the direction of the gas flow. Gas flow is supplied to and enters the casing at the end thereof adjacent the location of the ring of the largest diameter, and moves through the cone from the top down. The main part of the gas containing the lighter particles abruptly changes the direction of its motion and escapes upwardly through the inter-ring gaps for discharge to its next destination, while the larger particles continue to move downwardly through the cone. At the same time, the particles repeatedly impact on the ring surfaces (which incidentally, leads to considerable ring wear over a period of time) and are thereby projected towards the axis of the cone; they are thus concentrated and are removed with a part of the gas (typically 5–7% ) through the ring of the smallest diameter.

In a variation of this device (see the Van Der Kolk patents), a conical one-piece construction is made of a spirally wound wire having an either rectangular or trapezoidal cross-section, with the straight inside wire surface being obliquely inclined with respect to the cone axis and serving the same purpose as the flat conical ring in the previously described device.

The advantages of the above-described known conical inertial dust collectors reside in the simplicity and compactness of their design, an absence of moving parts, a relatively low drag for the gas flow, and a relatively high gas flow velocity through the device (i.e., a high throughput), as well as in that their efficiency does not change much with variations in the input dust density (Strauss, supra; Hansen, supra). The disadvantages of these devices are their inability to effectively remove particles smaller than 20–30 μm, and a relatively large amount of gas which does not get separated from the solid particles and has to be subsequently cleaned with downstream cyclones (Strauss, supra). That is in essence why conical inertial dust traps are mostly used as pre-cleaning devices, for removal of coarser particles.

Another disadvantage of the conical inertial dust collectors is the constant bombardment of the conical rings by solid particles, which in some cases leads to their relatively rapid erosion and wear, thus necessitating frequent maintenance, including ring replacement, and consequent system down-time.

Inertial dust separators with more elaborate, curvilinear particle-deflecting elements are also known. The Johnston patent, for example, describes a conical-type device with axially non-overlapping rings of a more complex shape, inwardly curved on the inside, and having a straight section and a lip designed in order to deflect solid particles toward the axis of the cone. The claimed total cleaning efficiency for the particles with average particle size between 20 and 30 μm is close to 80%. However, no detailed fractional efficiency data are given.

In another device (see the Keller patents), the gas flow is directed against the tip, i.e., from the narrowest to the widest end, of a conically shaped separator (which is thus inverted as compared to the cone-shaped inertial separator described above), with individual separator elements or rings overlapping each other and having their cross-section shaped as an obtuse triangle. The idea here is to provide deflection surfaces for the solid particles, just as before, although in an inverted geometry, whereby the concentrated particles are moving outside of a cone structure toward the wider base of a cone, while the cleaned gas escapes into the inside volume of the cone.

By virtue of the complex ring shape, curved channels are formed between the rings, the channels serving to provide escape passages for the partially cleaned gas flow. The passages thus formed open up toward the inside of a cone structure. This feature is supposed to help to prevent clogging of a device. Again, however, no experimental data are given. Moreover, it should also be noted that the device is intended primarily for separating solid particles from steam, which may be the reason for special attention paid to the clogging problem.

A somewhat similar device is described in the Maden patent in which one or two sets of particle deflectors or "vanes" are positioned in a hollow body of rectangular, circular or elongated shape as viewed in a cross-section normal to the flow direction. As in the Keller patents, in cross-section the vanes have a complex, curved, elongated triangular shape. They are positioned in the body so as to provide deflection surfaces for the incoming solid particles (with the preferred angle of the particle-deflecting front surface being at 34° to the axis of the device), and also so as to mask the passages between them from the direct hit by an incoming particle. By virtue of their inertia, solid particles (at least the larger ones) miss the passages between the vanes, and continue to move down the narrowing device, while the cleaned gas escapes between the vanes, through the curved passages defined in each case by the overlapping trailing surface of an upstream vane and the long back surface of the next adjacent downstream vane. Due to the concave shape of the trailing surface of each vane, the passage opens up toward the outside space between the system of vanes and the body of the device, as was also the case in the Keller patents. In addition, the passages between adjacent vanes may have a changing shape, with increasingly tortuous passages toward the outlet end of the device. This device is claimed to produce a cleaning efficiency of up to 89.7%, although it is not specified in the patent what kind of dust has been used for the test, nor even the average particle size. About 10% of the gas is lost through the outlet of the device together with concentrated dust.

BRIEF DESCRIPTION OF THE INVENTION

The main object of the present invention is to provide a device which separates solid particles, including particles smaller than 1 micron in size, from multiple-component fluids with a considerably higher cleaning efficiency than the known devices of this kind.

It is also an important object of the invention to provide such a device in which the fractional cleaning efficiency does not substantially depend on the sizes and distribution of sizes of the solid particles contained in the fluid.

Another important object of the invention is to provide a device which will operate with high cleaning efficiencies over a wide range of gas flow velocities through the device, from about 10 m/s to 100 m/s, and even higher velocities.

Among other objects of the invention are the provision of a device having a prolonged useful life as well as reduced size and weight, the possibility of using a variety of structural materials for the manufacture of the device, and the reduction of the required maintenance for the device during its operation.

These and other objects of the present invention are accomplished in a device for separating multiple-component fluids, preferably for separating gases from solid particles, which device includes a hollow truncated cone structure having a conical main section comprising a plurality of coaxially aligned rings of decreasing inner diameters, with the assembled rings being retained in their relative positions and orientations by, e.g., being rigidly secured at their outer peripheries to a plurality, at least two but preferably three or four, of posts, stringers, guide racks or like frame members spaced from each other peripherally of the rings. In use, the ring of the largest inner diameter of the conical section communicates with a pipeline for supplying a gas flow to be cleaned into the interior of the cone, and the ring of the smallest inner diameter communicates with a container for collecting the separated solid particles. Each ring has a curved inside surface, the profile of which is similar to the profile of the upper surface of the front edge region of an asymmetrical airfoil or airplane wing, facing partly counter to and partly across the direction of the gas flow through the cone structure, an outside surface, and a bottom or trailing surface extending from the inside surface to the outside surface and facing generally in the direction of the gas flow. The trailing surface of each ring intersects the inside surface in a sharp edge defining the inner diameter of the ring, with the trailing surface being oriented so that a tangent thereto (which may be the plane of the surface itself) makes an angle of at most 90° with respect to the direction of gas movement, and with the inside surface preferably being configured so that a tangent thereto at its juncture with the trailing surface is substantially parallel to the axis of the cone structure. The rings of the cone structure are arranged with respect to each other so as to define an axial space or gap between the plane of the sharp edge of each upstream ring and the plane of the highest region or top of the respective next adjacent downstream ring.

The cone structure is preferably installed in a casing and functions to cause the solid particles in the gas flow which are closest to the rings to be aerodynamically shifted toward the axis of the cone structure so that more and more particles gradually concentrate in the axial region of the cone structure as the gas flow travels therethrough, while permitting cleaned gas to escape laterally through the spaces between the rings into the surrounding interior region of the casing. The concentrated stream of particles, after having passed through the smallest-diameter ring of the conical main section, leaves the cone structure and is directed via a suitable discharge pipe or passageway into the collecting container. The casing, apart from supporting the cone structure, serves to deliver the cleaned gas to its next destination. The casing preferably has a cylindrical or tubular shape, for example, it may consist of a length of pipe with an inner diameter slightly larger than the outer diameter of the largest-diameter ring of the cone structure and an effective length approximately equal to the length of the cone structure (other cross-sectional shapes and dimensions may also be used, of course). For convenience of delivering the cleaned gas to its next destination, the pipe can be bent laterally at one end, for example, at a 90° angle, with the bend radius being equal to or greater than the pipe diameter.

In accordance with the present invention, the axial height or thickness of the rings as well as their radial width is preferably constant but may vary from one ring to the next, for example, with the rings decreasing in thickness as they decrease in width. It is also contemplated that the spacing between the plane of the sharp edge of an upstream ring and the plane of the top of the respective next adjacent downstream ring will be constant from ring to ring and may be equal to the thickness of the upstream ring.

As a general proposition, in a device according to the present invention it is contemplated: that the ratio of the inner diameter of the largest ring to the inner diameter of the smallest ring, i.e., the ratio of the diameter of the larger base of the conical main section of the cone structure to the diameter of its smaller base, will lie between about 10 and 100; that the ratio of the axial length of the conical main section to the diameter of its larger base will lie between about 5 and 20;[,] that the ratio of the radial width (outer diameter minus inner diameter) of each ring to its thickness will lie between about 0.5 and 2; that the ratio of the gap height between any two adjacent rings to the thickness of the upstream ring of that pair of rings will lie between about 0.7 and 3; and that the number of rings incorporated in a cone structure may be in the hundreds and thousands, depending on the size and intended use of the device, although for some devices as few as five rings may be sufficient.

In accordance with another embodiment of the invention, it is contemplated that the cone structure may have several additional rings provided downstream of the smallest-diameter ring of the conical main section, all of which have a diameter equal to the diameter of this ring and thereby define a cylindrical auxiliary section of the cone structure. Alternatively, an arrangement of several additional rings of consecutively increasing diameters may be provided immediately downstream of the said smallest ring of the conical main section, thereby to define an inverted conical auxiliary section of the cone structure. As a still further alternative, such an inverted conical auxiliary section may be provided downstream of a cylindrical auxiliary section by means of an arrangement of several rings of consecutively increasing diameters downstream of the last one of the rings of equal diameters. Such cone structures make it possible to achieve optimum conditions for removing separated particles into the hopper.

The cone structure in all of the above-mentioned embodiments may also be made in the form of a spiral, with each turn of the spiral body effectively constituting a ring, and with the distance between adjacent turns of the spiral corresponding to the distance between the adjacent ones of the full rings. This allows the manufacture of the cone structure to be facilitated and automated.

The construction of the device according to the present invention enables the cleaning or separation of a gaseous fluid from solid particles in a wide range of sizes, including particles finer than 1 micron in size, and at a high velocity of gas flow through the device (i.e., a high throughput) and at a low resistance to the gas flow, while providing a high cleaning efficiency which does not substantially depend on the sizes and distribution of sizes of particles present in the gas flow, nor on the concentration of dust at the input end of the device. Moreover, the fractional composition of the particles is in essence not affected by the cleaning, so that when cleaned gas is fed into a second modular unit connected in series with the first one, the fractional composition of the solid particles in that gas will be substantially the same as in the original flow. Also, the size and weight of the device are reduced, and a stable nearly maintenance-free operation of the device is ensured even under fluctuations of the dust concentration and the fractional composition of the solid particles fed into the device.

The invention may be used for cleaning industrial and household gas flows, e.g., from metallurgical, chemical, thermal utility and other plants, and for cleaning air for industrial and household use, e.g., for the electronics and precise instrumentation industries, for public and residential buildings, etc. It can be also used to separate and collect valuable material dispersed in a particulate form in a body of air or a gas or a like fluid, e.g., to separate and collect coal dust in a coal-mining operation, or to collect metal powder produced in a metallurgical process, etc.

In any such device, it will be understood, the same may be a preassembled unit comprising both a multi-ring cone structure as described and an associated casing designed for connection to an outlet end of a main duct or pipeline, and may possibly also comprise an associated hopper. However, especially when the device is to be used to collect particles of valuable material rather than to clean a fluid, but also in any case in which it may not be feasible to add a composite cone structure and casing unit to the existing pipeline or duct, the device may comprise only a separate cone structure. Such a cone structure may be installed per se at an end of a duct or pipeline without any surrounding casing, so that only the particles separated from the fluid flow would be collected in a hopper while the cleaned but unwanted fluid (assuming it to be environmentally friendly and non-polluting) would escape through the inter-ring spaces into the surrounding atmosphere. Alternatively, of course, the casing-less cone structure may be installed in a preexisting duct or pipeline section through which the particles are normally fed away from the main operation, which duct or pipeline section will then constitute and serve as a casing for the cone structure and also will have a collecting container suitably connected thereto, for example, in a laterally offset position, in direct communication with the discharge end of the cone structure.

BRIEF DESCRIPTION OF THE DRAWINGS

The foregoing and other objects, characteristics and advantages of the present invention will be more clearly understood from the following detailed description of various embodiments thereof when read in conjunction with the accompanying drawings, in which:

FIG. 1B is a sectional view taken along the line 1B—1B in FIG. 1;

FIG. 1C is a view similar to FIG. 1A and illustrates a modified conical arrangement of the rings;

DETAILED DESCRIPTION OF THE INVENTION

Figure 1:
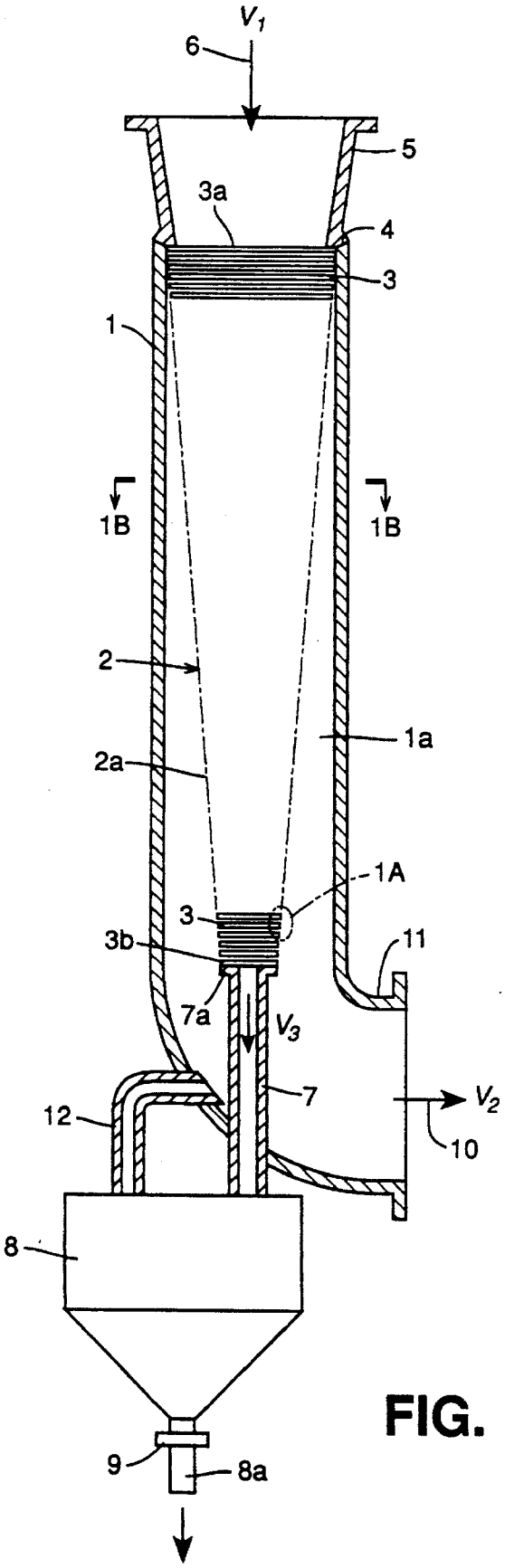
FIG. 1 is a schematic illustration, partly in section and partly in elevation, of a multiple-component fluid separating device according to one embodiment of the present invention wherein a cone structure comprising a truncated conical main section composed of a plurality of rings of consecutively decreasing diameters is provided in a tubular casing.
Figure 1A:
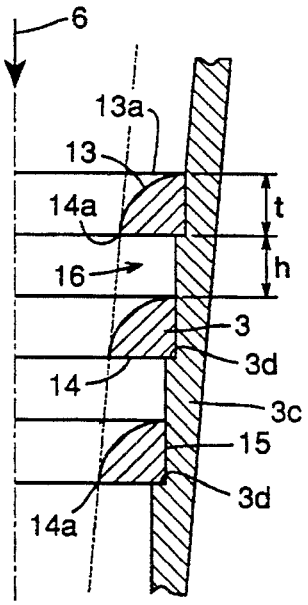
FIG. 1A is an enlarged sectional detail view of the circled portion of the cone structure shown in FIG. 1 and schematically illustrates the shape of the inside surface of the cone-forming rings as well as one manner of supporting the different-diameter rings in fixed relation to each other.

Referring now to the drawings in greater detail, there is shown in FIGS. 1, 1A and 1B a device according to a first embodiment of the present invention for separating two-component fluids and designed in particular for cleaning gas flows from solid particles, e.g., from dust, ash, or the like. The device has a casing 1 of, e.g., a tubular or cylindrical construction (see FIG. 1B) which accommodates a hollow truncated cone structure 2 and defines about the latter a surrounding space 1a. The casing may, however, be otherwise configured. The cone structure 2 comprises a conical main section 2a which is made up of and defined by a plurality of coaxially arranged, axially spaced rings 3 of progressively diminishing diameters, the configurations of which will be more fully described presently. The rings preferably are made of metal or a metallic alloy, e.g., stainless steel or the like, although they may be made of any suitably hard material including reinforced plastics and the like.

The largest-diameter ring 3a of the conical main section 2a of the cone structure 2 and the surrounding intake end of the casing 1 are connected in a fluid-tight manner by means of circumferential seals, e.g., welds or the like, to a flange 4 of a connecting section 5 of a pipeline (not shown) for supplying a gas flow to the casing in the direction of the arrow 6. The ring 3b of the conical main section 2a of the cone structure having the smallest diameter is connected similarly to a flange 7a of a discharge pipe or passageway 7 leading to a collecting container or hopper 8. As will be more fully described hereinafter, particles separated from the gas flow leave the cone structure 2 and enter the pipe 7 through the ring 3b for transfer to the hopper, while cleaned gas leaves the cone structure and enters the surrounding space 1a through gaps between the rings.

The hopper 8, which is not drawn to scale in any of FIGS. 1–5, is provided with a downwardly directed outlet pipe 8a which is equipped with a shut-off valve 9 to enable accumulated particles to be discharged from the hopper. Although it is not always essential, as will become clear as the description proceeds, in the embodiment of the invention shown in FIG. 1, the hopper is also provided with an upwardly directed vent pipe 12 leading back into the casing 1, to enable at least a portion of the particle-laden gas which enters the hopper through the pipe 7 to be returned, after the particles initially entrained therein have settled out in the hopper, to the cleaned gas flow in the space 1a of the casing 1. Alternatively, such extraction of gas from the hopper may be effected by other means than a vent pipe, e.g., with the aid of a pump. The cleaned gas may exit from the casing in any suitable manner, e.g., in the direction of the arrow 10 via an angled or laterally bent section 11 of the casing.

As best shown in FIGS. 1A and 1B, the assembled rings 3 of the cone structure 2 are retained in their relative positions and orientations by a plurality of frame members in the form of stringers or posts 3c extending from the ring 3a of largest diameter to the ring 3b of smallest diameter, the rings being rigidly secured at their outer peripheries to the frame members in any suitable manner, e.g., by welding, adhesive bonding, or the like, or, if the sizes of the rings permit, by means of screws, bolts, or the like. In the illustrated embodiment, four stringers or posts 3c are shown as being used (they have been omitted from FIG. 1 for the sake of simplicity), although three or five or, in the case of a very large cone structure, even more would be equally satisfactory (subject only to the constraint that they may not be so numerous and crowded as to unduly obstruct the required spacings or gaps between the rings) and even two would be acceptable in the case of a very small cone structure, and each frame member is shown as being provided (although this is not essential or indispensable) with step-like formations 3d at its inwardly directed face as aids to securing the proper location of the various rings.

Referring now in particular to FIG. 1A, it will be seen that, as viewed in a radial cross-section passing through the axis of the cone structure, each ring 3 effectively has three surfaces: an inside surface 13 which extends from the upper region or top 13a of the ring to the bottom thereof and which is exposed, at least in its radially innermost part, to the incoming gas flow; a bottom surface 14 which, when viewed with respect to the direction of the gas flow, is also the trailing surface of the ring and which intersects the inside surface 13 at a sharp circumferential edge 14a defining the inner diameter of the ring; and an outside or peripheral surface 15. The inside surface 13 is convexly curved, with a profile and degree of curvature which will be more fully described presently. The trailing surface 14 is preferably horizontally planar, as shown in FIG. 1A, but it may actually have almost any desired configuration or shape, e.g., it may be obliquely planar as shown in solid lines at 14' in FIG. 1D or it may be concavely or convexly curved as shown in broken lines at 14" and 14" in FIG. 1D, subject only to the necessary condition that the angle $\alpha$ between the axis of the cone structure, which is also the direction 6 of the gas flow, and the tangent to the trailing surface at the edge 14a does not exceed 90°. It will be understood, of course, that in the case of a planar trailing surface such as 14 or 14", this tangent coincides with the surface itself, so that the angle $\alpha$ is the angle between the cone axis and the plane of the surface. The shape of the outer surface 15 preferably is vertically planar, as shown in FIG. 1A, but it may also, irrespective of the configuration of the trailing surface, merge curvilinearly with the top 13a of the ring, as shown at 15a in FIG. 1E.

Figure 6:
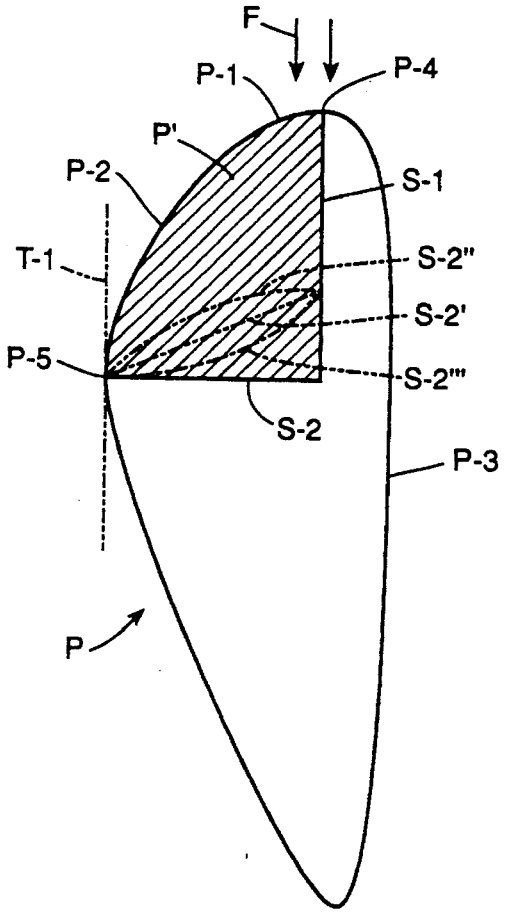
FIG. 6 is a schematic representation of an asymmetric airfoil profile and illustrates the genesis of the ring profiles shown in FIGS. 1A and 1D.

As previously mentioned, the profile or cross-sectional configuration, and especially the curvature, of the inside surface 13 of a ring 3 such as is shown in FIG. 1A, is derived from and corresponds generally to the profile of the front or leading edge region of an asymmetric airfoil or airplane wing. Such an airfoil profile, designated P in FIGS. 6 and 7, in essence is cross-sectionally characterized by a blunt front edge region P-1 which normally faces into the direction F of the oncoming airflow, a convexly curved top edge region P-2, and a planar bottom edge region P-3. Within that profile there may be defined, as shown in FIG. 6, a cross-hatched section designated P' which is bounded on the one hand by contiguous portions of the curved lines P-1 and P-2 running from the forwardmost point P-4 of the line P-1 to the highest point P-5 of the line P-2 (i.e., where the airfoil thickness is greatest), and on the other hand by two mutually perpendicular and intersecting lines S-1 and S-2, of which the line S-1 runs longitudinally of the profile P starting from the point P-4 while the line S-2 runs transversely of the profile P starting from the point P-5 where the tangent T-1 to the line P-2 is parallel to the direction F of the incident airflow. Alternatively, the transverse boundary line of the hatched profile section P' may have a somewhat different configuration and/or orientation than the line S-2; for example, although starting from the point P-5 in all cases, it may be obliquely straight or either concavely or convexly curved, as indicated by the respective broken lines S-2" S-2" and S-2' in FIG. 6, as long as the angle made by the tangent to any such line at the point P-5 with the tangent T-1 does not exceed 90°.

Figure 1D:
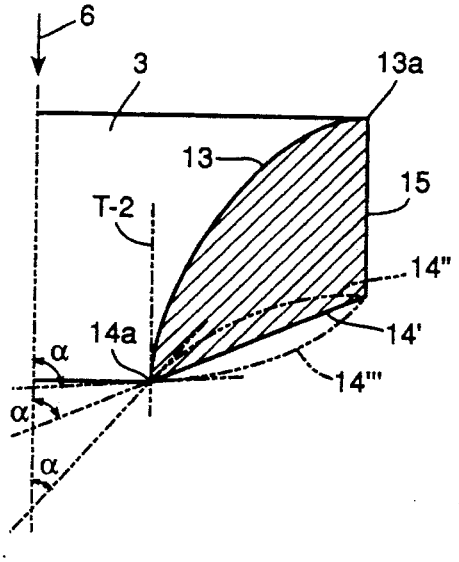
FIG. 1D is a radial section through a single ring, similar to FIG. 1A but on a somewhat enlarged scale, and illustrates a modification of the ring structure in its trailing or bottom surface.

It will be readily apparent, therefore, that the illustrated profiles of the rings 3 shown in FIGS. 1A and 1D are basically the same as the profile of the hatched section P' within the solid-line and broken-line boundaries thereof shown in FIG. 6, with the inside surface 13 of each ring corresponding to the portion of the airfoil surface region represented by the line P-1/P2 between the points P-4 and P-5, and with the bottom and outside surfaces 14 (or 14'/14"/14''') and 15 of each ring corresponding to the regions represented by the boundary lines S-2 (or S-2'/S-2"/S-2''') and S-1, respectively. It should be understood, however, in this regard, that the shape of the front surface region of an airfoil is rather complex, and while this might be an ideal configuration for the ring surface 13, technological difficulties associated with machining or molding the rings may preclude its actual duplication and may require some simplifications of the shape. Merely by way of example, pursuant to such a simplification the inside ring surface 13 may have an elliptical, hyperbolic or parabolic curvature, with the tangent to the bottom surface 14 (or 14'/14"/14''') at the edge 14a being oriented so as to make an angle $\alpha$ with the tangent T-2 to the portion of the surface 13 at the edge 14a (and hence with the axis of the ring) which is not greater than 90°, and with the simple planar outside surface 15 meeting the inside surface 13 at the sharp top edge 13a. It is furthermore preferred that the curvature of the inside surface 13 of each ring be such that the tangent T-2 actually is parallel to the direction of flow and the cone axis, since such a surface orientation tends to present the least interference with the arrival of the gas flow at the sharp edge 14a.

Figure 1E:
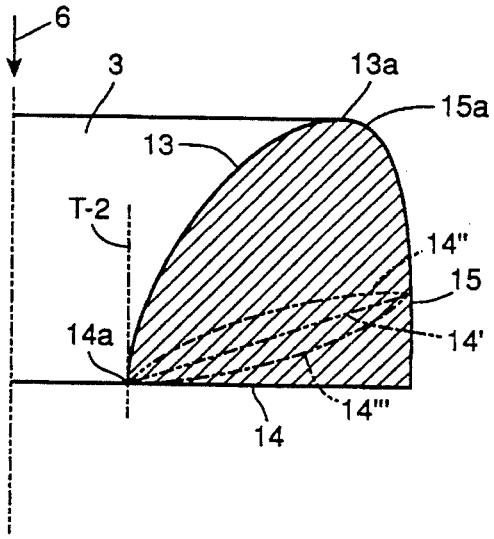
FIG. 1E is a view similar to FIG. 1D and illustrates a modification of the ring structure at its top in the region of the juncture between its inside and outside surfaces.
Figure 7:
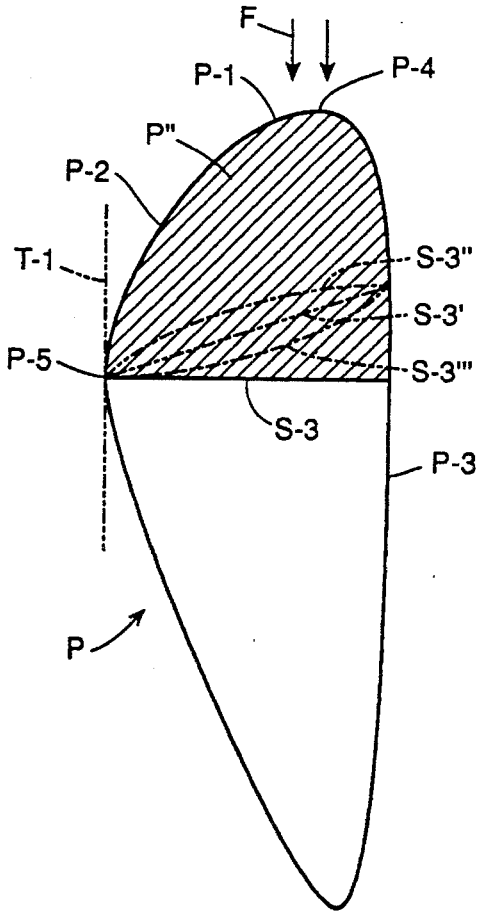
FIG. 7 is a view similar to FIG. 6 and illustrates the genesis of the ring profile shown in FIG. 1E.

As yet another alternative, there may be defined in the front region of the profile P, as shown in FIG. 7, a cross-hatched section designated P" which is bounded on the one hand by the forwardmost curved line P-1 and the respective portions of the top and bottom lines P-2 and P-3 contiguous therewith, and on the other hand by a transverse line S-3 starting at the point P-5 on the line P-2 and running at a 90° angle to the tangent T-1 all the way to the line P-3. As before, of course, and subject to the same angle constraint, the transverse boundary may be obliquely straight or either concavely or convexly curved, as indicated in broken lines at S-3', S-3" and S-3'''. The corresponding ring profiles are shown in FIG. 1E, and it can be seen that there the outside surface 15 merges with the inside surface 13 at the top 13a of the ring via a curved surface portion 15a.

Figure 1F:
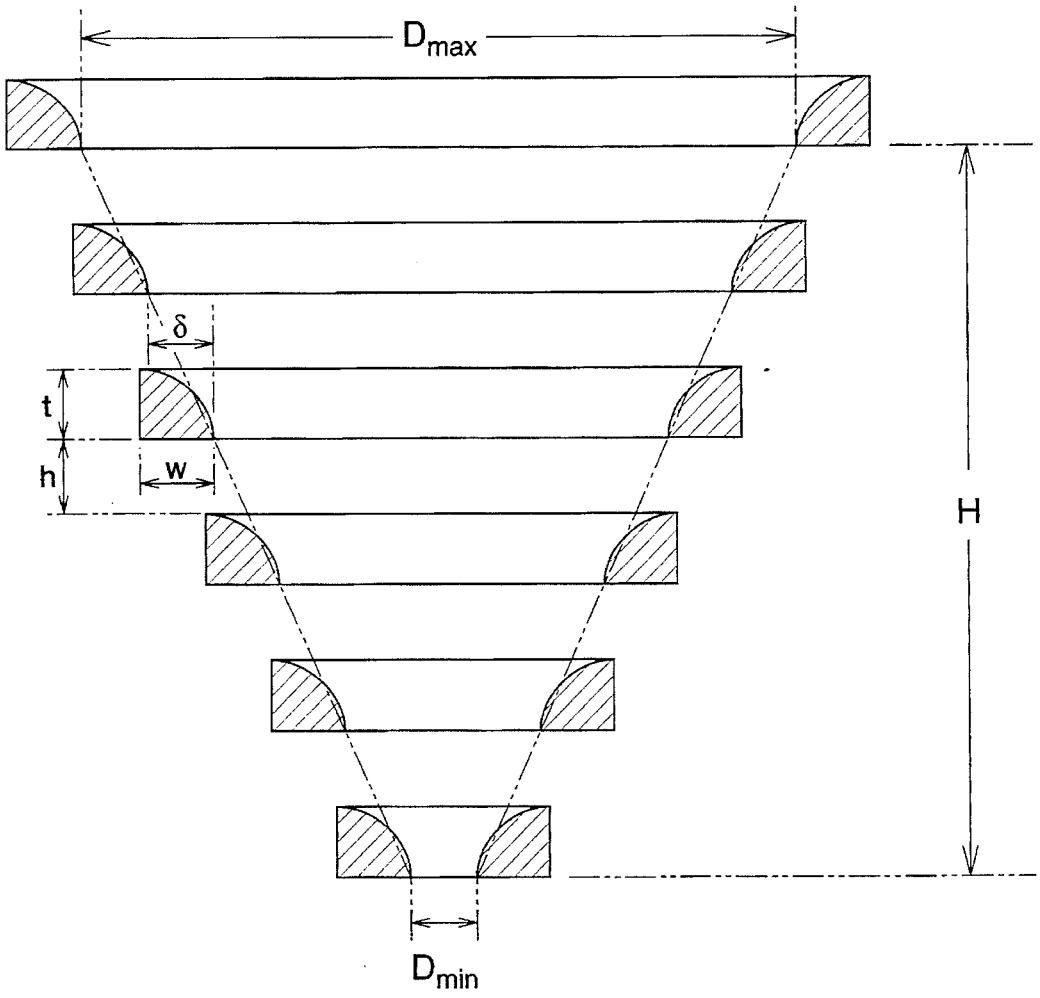
FIG. 1F is a diagrammatic representation of a cone structure according to the present invention and illustrates the basic physical parameters thereof.

Referring now to FIG. 1F, each of the rings of the conical main section of the cone structure can be seen to be characterized by a thickness or axial height t and a radial width w (which is the difference between its inner and outer diameters), and the various rings are so positioned that the plane of the sharp edge of any given upstream ring is spaced along the axis of the cone structure from the plane of the highest region or top of the next adjacent downstream ring by a gap having an axial height or width h. For effective operation of the device, the relationships between its physical parameters, namely, w, t, h, the inner diameters of the largest and smallest rings, respectively, of the conical main section 2a (which are measured at the respective sharp edges 14a of those rings and may be denoted as $D_{max}$ and $D_{min}$), the axial height or length H of the conical main section (measured from the plane of the edge 14a, i.e., the bottom, of the largest ring to the plane of the edge 14a, i.e., the bottom, of the smallest ring), and the radial distance or offset $\delta$ between the sharp edge of one ring and the sharp edge of the next adjacent ring, should preferably be as follows:

$$0.5 \leqq w/t \leqq 2 \quad (1)$$

$$0.7 \leqq h/t \leqq 3 \quad (2)$$

$$10 \leqq D_{max}/D_{min} \leqq 100 \quad (3)$$

$$5 \leqq H/D_{max}. \leqq 20 \quad (4)$$

$$0.02 \leqq \delta/w \leqq 0.8 \quad (5)$$

The dimensions of the rings and of the assembled cone structure in any given case will, of course, vary in dependence on the desired size of the device and the intended application (nature of the fluid and the particles, throughput, particle sizes, density of the mass of particles in the fluid, etc.) to which it is to be put, subject to satisfaction of the above-stated relationships. It will be understood, however, that the choice of ring dimensions may be limited by considerations of technological difficulties which the production of very large and very small rings may entail. Practical ranges of such dimensions (in milli-meters) at the present time appear to be the following:

$$10\text{ mm} \leqq D_{max} \leqq 2{,}000\text{ mm}$$

$$1\text{ mm} \leqq D_{min} \leqq 200\text{ mm}$$

$$50\text{ mm} \leqq H \leqq 20{,}000\text{ mm}$$

$$1\text{ mm} \leqq t \leqq 100\text{ mm}$$

$$1\text{ mm} \leqq w \leqq 100\text{ mm}$$

$$0.7\text{ mm} \leqq h \leqq 300\text{ mm}$$

The device functions in the following manner. Considering any two adjacent rings 3 in the conical main section of a cone structure 2 as viewed in the direction 6 of the gas flow, it is apparent that the inner diameter of the downstream or lower ring of the pair is smaller by $2\delta$ (where $\delta$ is the radial offset defined above) than the inner diameter of the upper one, to an extent that a line which is parallel to the axis of the cone structure and passes through the sharp edge 14a of the upstream ring intersects the inside surface 13 of the downstream ring at a point located radially outwardly of the sharp edge 14a of that downstream ring. This condition, which ensures that there is an overlap between those two rings and hence that there is no straight-line path between them running parallel to the axis of the cone structure and open to the passage of fluid in that direction, implies that the cylindrical outer layer of the gas flow which has passed freely through the upper ring will come up against and be intercepted by the lower ring. This "cut off" amount of gas has to escape through the gap or passageway 16 between the two rings, since otherwise pressure would start building up inside the cone structure as the gas flow moves down the same. Thus, as the cone structure narrows down, the outer parts of the gas flow at each level escape through the gaps 16 between the proximate rings from the interior of the cone structure to the space 1a external thereto in the casing 1.

Once the gas escapes to this outer space, it continues to move generally in the same direction as the gas inside the cone structure, i.e., toward the exit part 11 of the casing, and eventually is discharged to its intended destination through the exit opening of the casing. To the extent to which the cone-shaped system of rings presents certain additional drag to the gas flow inside the casing as compared to the drag that would be presented to the gas flow by an empty casing, there exists a pressure differential between the space inside the cone structure (which is at a somewhat higher pressure) and the surrounding space 1a outside the cone structure (which is at a somewhat lower pressure). Owing to the size of the gaps 16 between the rings, i.e., since the total area of the open spaces between the rings of the cone structure is considerably greater than the cross-sectional area of the casing, this pressure differential is relatively insignificant, but it is nonetheless the cause of the gas escaping through the gaps 16 between the rings 3.

Although it is not intended to set forth any particular theoretical explanation of what takes place inside the cone structure 2 as the particle-laden gas flow moves through the same, it would seem that as the gas flow impacts against the curved inside surface 13 of a ring 3, the cylindrical outer layer of the gas flow follows the curvature of that surface and comes to the associated sharp edge 14a. As previously stated, the outer layer of the gas flow must escape through the proximate gap 16. In order to do so, it must move around the sharp edge 14a, thus abruptly interrupting its flow along the curved surface 13. The direction of motion of the gas in the cylindrical outer layer thus changes from the downward flow direction 6 to a radial flow direction through the gap 16. This non-linear motion of the gas around the edge 14a creates local forces or local pressure differentials acting on the solid particles moving with the gas flow. At each ring level, these forces are directed toward the cone axis, thus throwing the particles back into the main gas flow rather than allowing them to escape with the gas escaping through the gap 16.

Another way to view the consequences of an abrupt interruption of the gas flow at the sharp edge 14a is to assume that this interruption leads to the formation of vortices in the gas flow. As a result of these vortical flows at the radially inner boundaries of the gaps 16, a continuous elastic gas layer directed along an imaginary conical tangent to the curved surfaces 13 of the rings is formed, so that the solid particles in the region of that layer within the cone structure are cushioned from the ring surfaces and at the same time are forced into the central part of the gas flow. Thus, while the gas flows so formed at the inside surfaces of the rings protect the rings against wear, the solid particles are centrally concentrated as they are passing through the cone structure, which leads to their subsequent discharge into the hopper 8 through the pipe 7. Concurrently therewith, the portion of the gas flow which, having been cleaned of the solid particles forced into the center of the cone, has entered into the gaps or spaces 16 between the rings, passes out of the cone structure into the surrounding space 1a of the casing and exits therefrom through the end section 11 of the casing to a receiving location.

The device enables a high efficiency (to the extent of at least 95%) of cleaning of a multiple-component gas flow to be achieved over a wide range of gas flow velocities, including high gas velocities of up to 100 m/s, which give a high throughput, and with low resistance for the gas flow, which result in actual practice does not depend on the fractional composition of the solid particles in the gas flow over the range of particle sizes from less than 1 micron to as much as 1000 microns. Moreover, the device does not have any moving parts, shows little if any signs of wear after prolonged use, requires minimal maintenance, and is relatively light and compact when compared to the existing dust-collecting devices capable of a similar gas throughput.

By virtue of the construction of the apparatus according to the present invention, the gas flow velocities $V_1$ and $V_2$ at the inlet and outlet ends (FIG. 1) of the casing 1 are substantially identical, while the flow velocity $V_3$ of the gas-borne stream of concentrated solid particles at the outlet end of the cone structure 2 can vary from being substantially identical to $V_1$ and $V_2$ to being appreciably lower than $V_1$ and $V_2$. This depends on the details of the construction of the device, including the size and configuration of the hopper 8. A part, actually less than 1%, of the original gas flowing into the casing enters the hopper 8 together with the concentrated stream of particles, but this portion of the gas then separates from the particles as the same settle to the bottom of the hopper and is removed from the hopper by being vented out of the same through the vent pipe 12 or a suitable exhaust pump or the like.

Figure 2:
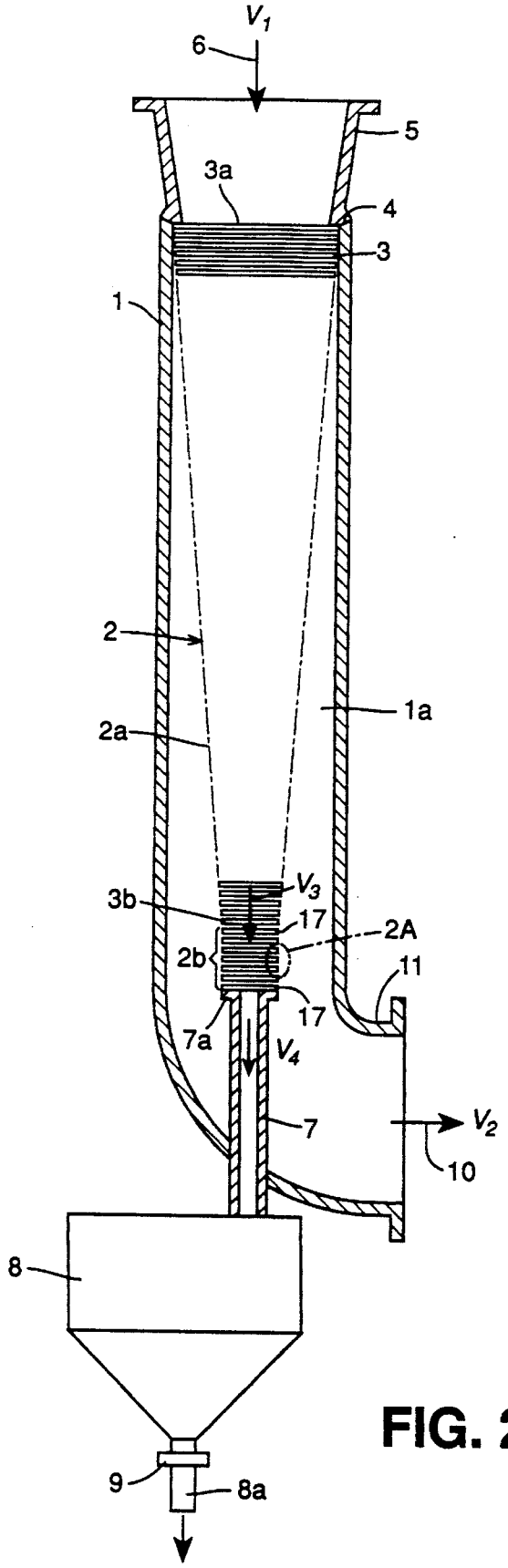
FIG. 2 is a view similar to FIG. 1 and shows a device according to a second embodiment of the invention wherein the cone structure downstream of the smaller end of the conical main section is also provided with a cylindrical auxiliary section composed of a series of additional rings of the same inner diameter as the smallest-diameter ring of the conical main section.
Figure 2A:
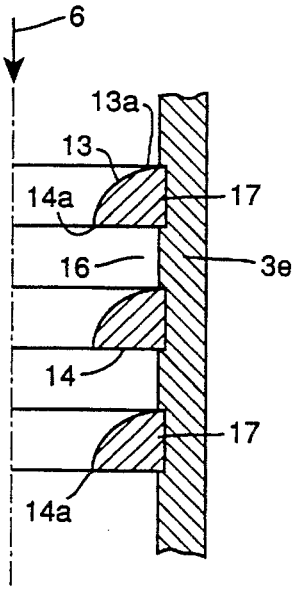
FIG. 2A is a view, similar to FIG. 1A, of the circled portion of the cone structure shown in FIG. 2 and schematically illustrates one manner of supporting the rings of the cylindrical auxiliary section in fixed relation to each other.

To reduce even further the fraction of gas getting into the hopper through the pipe 7, it is contemplated, in accordance with a second embodiment of the present invention, to provide downstream of the smallest-diameter ring 3b of the conical main section 2a of the cone structure 2 (see FIG. 2), a cylindrical auxiliary section 2b constituted by a number of additional rings 17 all of which have the same inner diameter and surface and cross-sectional configurations as the ring 3b and are secured in place by frame members, e.g., posts or stringers 3e (FIG. 2A), which extend, in a manner not expressly shown, at an angle to the frame members 3c associated with the conical main section of the cone structure. The purpose of these additional rings 17 is to slow down the portion of the gas containing the concentrated solid particles (since in the region of the cylindrical auxiliary section the cone structure 2 is no longer narrowing down), thus further increasing the concentration of solid particles in the part of the stream moving toward the hopper 8.

As was previously mentioned, there exists a pressure differential between the inside of the cone-shaped structure and the outside volume 1a. This pressure differential will also exist between the inside of the auxiliary section 2b in the region of the equal-diameter rings 17 and the outside volume 1a. Thus, the gas from the inside of the section 2b will escape into the surrounding space within the casing 1 through the openings between the equal-diameter rings, in the same manner as was described previously in the case of the rings of the conical main section 2a. However, because of the presence of the equal-diameter rings, the volume of the gas flow is no longer decreasing as the gas moves through the section 2b, since the area available for the gas flow does not change (unlike the case of the conical main section 2a). This implies that the gas flow velocity must decrease as the gas flow moves through the section 2b. The number of rings 17 thus should be chosen in such a manner that the axial height of the cylindrical auxiliary section 2b is not greater than the height H of the conical main section 2a and that the velocity $V_4$ of the flow at the downstream end of the region of the equal-diameter rings 17 is substantially lower than the velocity $V_3$ of the flow at the end of the conical main section 2a, or is close to zero, while the cleaning efficiency still remains acceptably high. This allows gas removal from the hopper through a vent pipe to be dispensed with, and also allows a reduction in the size of the hopper. The cleaning efficiency will, of course, be lowered by a certain amount, perhaps 1 to 3%, depending on the length of the cylindrical auxiliary section of the cone structure. The slight lowering of the cleaning efficiency has to do with the fact that at very low speeds the particle-trapping action of the rings is reduced, thus allowing a small fraction of the concentrated solid particles to escape with the gas moving through the gaps 16 between the rings 17. This is a reasonable trade-off, however, considering the advantage of using a smaller hopper 8 without a vent pipe.

Figure 3:
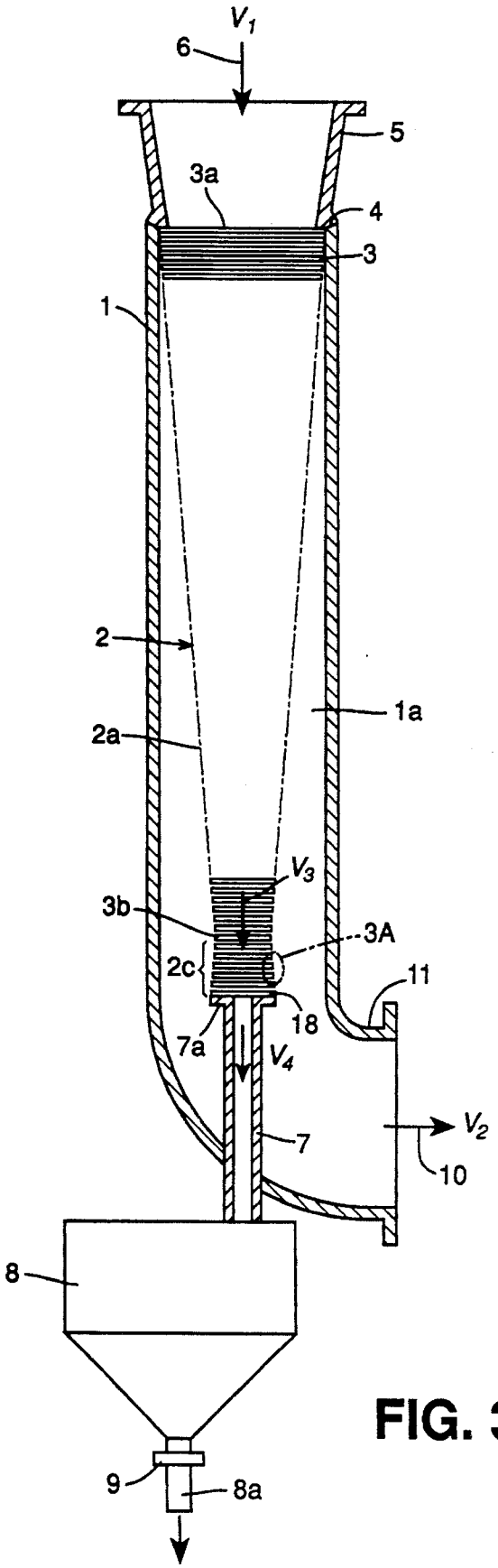
FIG. 3 is a view similar to FIG. 1 and shows a device according to a third embodiment of the invention wherein the cone structure downstream of the smaller end of the conical main section is also provided with an inverted conical auxiliary section composed of a series of additional rings of consecutively increasing diameters.
Figure 3A:
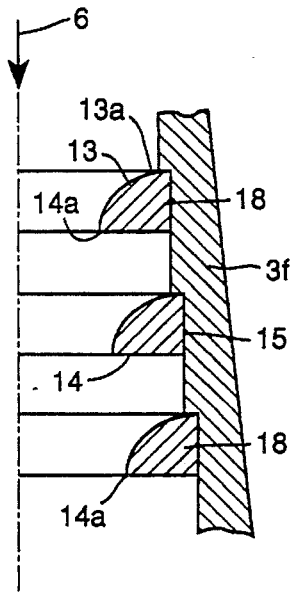
FIG. 3A is a view, similar to FIGS. 1A and 2A, of the circled portion of the cone structure shown in FIG. 3 and schematically illustrates one manner of supporting the rings of the inverted conical auxiliary section in fixed relation to each other.

The same result can be achieved in a device according to a third embodiment of the invention in which a number of additional rings 18 of consecutively increasing inner diameters and constituting an auxiliary inverted cone section 2c are provided downstream of the smallest-diameter ring 3b of the conical main section 2a (FIG. 3), with the rings 18 being secured in place by frame members 3f (FIG. 3A) similar to the frame members 3c but angled in the opposite sense relative to the axis of the cone structure. Optimum conditions for dust removal into the hopper 8 are achieved in this embodiment of the device if the conical main and auxiliary sections have the same taper, with the height of the auxiliary section being not greater than the height of the main section.

Figure 4:
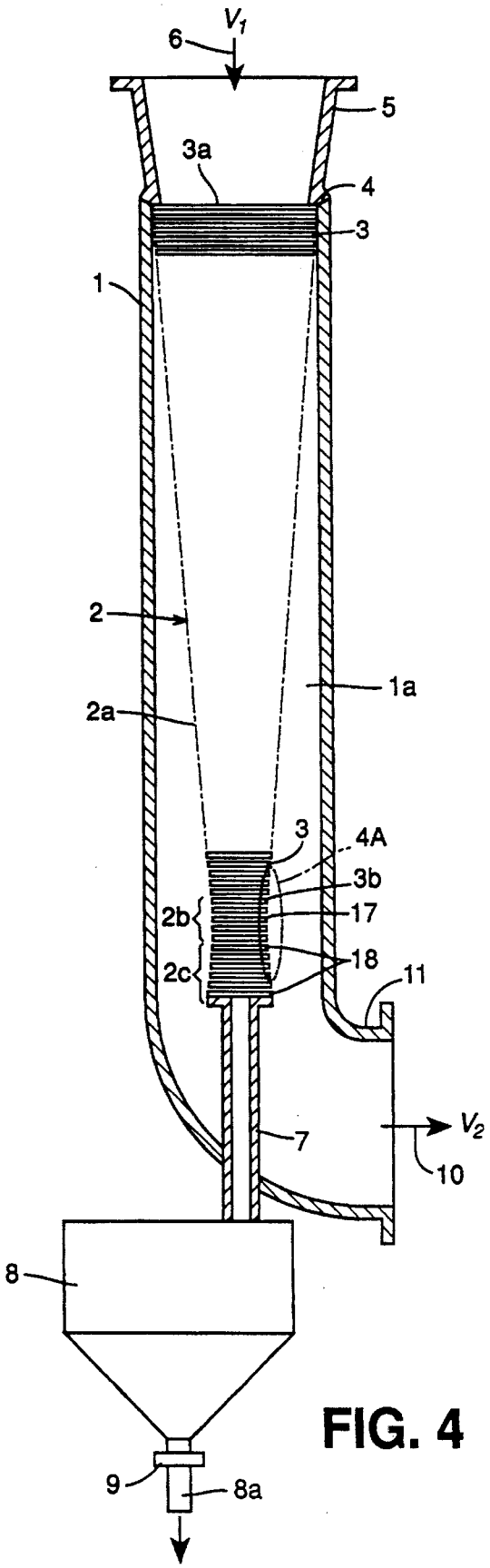
FIG. 4 is a view similar to FIG. 1 and shows a device according to a fourth embodiment of the invention wherein the cone structure downstream of the smaller end of the conical main section is also provided with both a cylindrical auxiliary section and an inverted conical auxiliary section constituted, respectively, by a series of additional rings of equal diameters and a series of additional rings of consecutively increasing diameters.
Figure 4A:
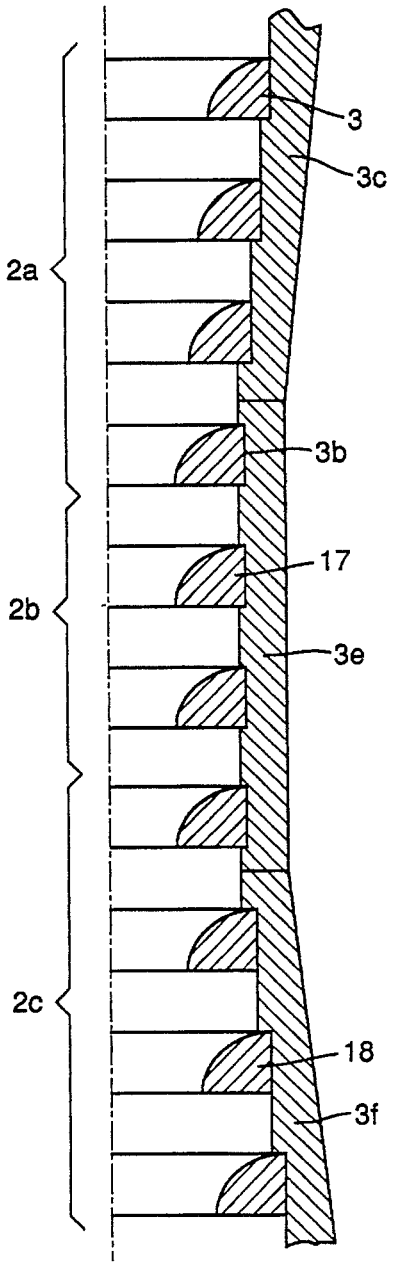
FIG. 4A is a view, similar to FIGS. 1A, 2A and 3A, of the circled portion of the cone structure shown in FIG. 4 and schematically illustrates one manner of supporting the rings of the three sections of the cone structure in fixed relation to each other.

In accordance with a fourth embodiment of the invention, there is provided a device in which a number of rings 18 of consecutively increasing inner diameters and constituting an auxiliary inverted cone section 2c as in the third embodiment are combined with a cone structure having a cylindrical auxiliary section 2b provided therein as in the second embodiment, with the rings 18 of increasing inner diameters here being provided downstream of the cylindrical auxiliary section 2b constituted by a plurality of equal-diameter rings 17 having an inner diameter equal to the inner diameter of the smallest-diameter ring 3b of the conical main section 2a (FIG. 4), with the three sets of rings 3, 17 and 18 being secured in place by respective sets of frame members 3c, 3e and 3f (FIG. 4A), and with the composite height of the two auxiliary sections being not greater than the height of the conical main section. This arrangement enables the properties of the multi-ring cylindrical and inverted cone auxiliary sections to be most efficiently used.

Figure 5:
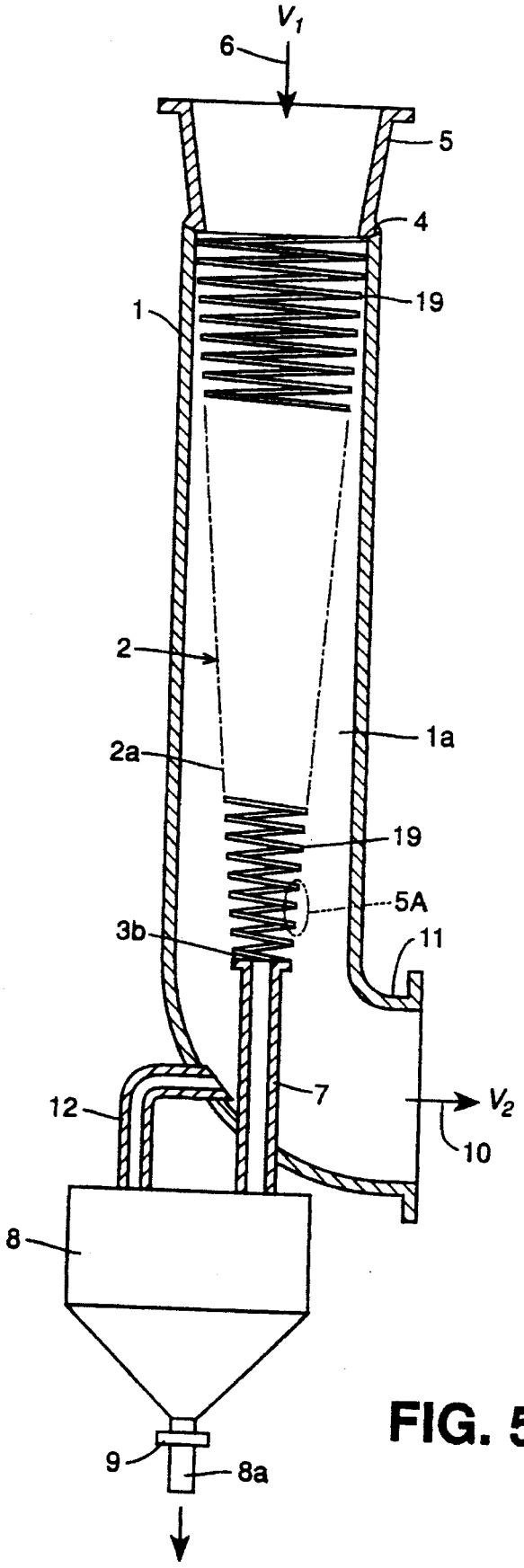
FIG. 5 is a view similar to FIG. 1 and shows a device according to a fifth embodiment of the invention wherein the cone structure (shown, for the sake of simplicity, as comprising only a conical main section) is illustrated as having the form of a continuous spiral with a plurality of turns of decreasing diameters simulating the full rings of the other embodiments.
Figure 5A:
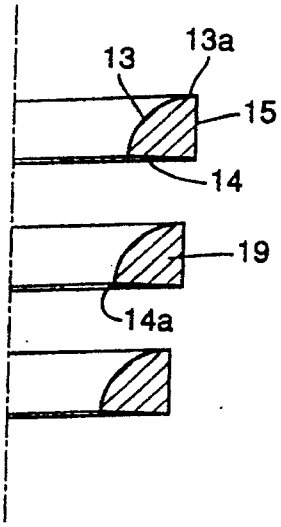
FIG. 5A is a view, similar to FIGS. 1A, 2A, 3A and 4A, of the circled portion of the cone structure shown in FIG. 5.

In accordance with a fifth embodiment of the invention, it is contemplated also that the apparatus according to any of the various embodiments described above may have the cone structure 2 (whether consisting only of a main section 2a or of the same combined with either or both of the auxiliary sections 2b and 2c) made in the form of a spiral (FIG. 5). In such a cone structure, the pitch of the spiral would be relatively small and the spiral strip would have an arcuately configured inside surface 13 as well as, for each turn, a top 13a, a trailing or bottom surface 14, a sharp edge 14a at the juncture of the inside and bottom surfaces, and an outer surface 15. Each single turn 19 of the spiral cone structure constitutes the equivalent of one of the rings 3 of the conical main section 2a of the other embodiments (and, as the case may be, also of one of the rings 17 and/or 18). This facilitates manufacture of the cone structure and allows production thereof to be automated. As shown in FIG. 5A, the essentially one-piece construction of the spiral cone structure enables the use of frame members to be dispensed with, although they may, of course, be used even with a spiral cone structure if that is deemed necessary or desirable, for example, to inhibit flexing or distortion of the same. However, since in FIG. 5 the cone structure is shown as having only a conical main section 2a, it is contemplated to provide the hopper 8 with a vent pipe 12 (or with a suitable exhaust pump or the like) as and for the reasons described above in connection with the embodiment of FIG. 1.

To enhance throughput capacity, two or more of the devices according to the invention can be connected in a modular fashion in parallel. Correspondingly, to enhance the cleaning efficiency, two or more of such devices can be connected in a modular fashion in series.

As is apparent from FIGS. 1 and 1A, the conical main section 2a of the cone structure there illustrated is a straight-line cone; in other words, the locus of the sharp edges 14a of the various rings 3 is in effect a surface of revolution of a straight line extending obliquely relative to the axis of the cone structure. It is within the contemplation of the present invention, however, that the locus of the edges 14a may also be a surface of revolution of a curved line (see FIG. 1C) about the cone axis. The term "cone-structure" as used herein thus is intended to designate, and should be interpreted as designating, both a straight-line and a curved-line cone arrangement.

It will be understood that a highly significant feature of the invention is that the separation of the particles from the fluid is effected essentially aerodynamically, i.e., through the exertion of fluid pressure differentials on the particles, causing little or no destructive effect on the ring surfaces and minimizing any mechanical actions such as impacts of particles against and deflection thereof by the ring surfaces which would tend to damage the ring surfaces.

The invention and its properties and advantages will be still more fully comprehended and appreciated from the following non-limiting examples of practical implementations on a test scale.

EXAMPLE 1

The largest ring of the cone structure of a device constructed as shown in FIG. 1 had an inner diameter of 200 mm, and the inner diameter of the smallest ring was 20 mm. All rings were of one and the same thickness of 5 mm and had a radial width of 5 mm. The bottom or trailing surface of each upstream ring was horizontally planar and spaced from the top of the next adjacent downstream ring at a distance of 5 mm. The axial height of the cone structure was 2000 mm. The velocity $V_1$ of the dust-carrying gas flow supplied into the device was varied from 15 m/s to 90 m/s in different test runs, and the dust concentration was varied from 1 to 10 g/m$^3$. The dust had the following fractional composition:

| | |
|---|---|
| from 1000 to 50 μm | 50% |
| from 50 to 1 μm | 45% |
| less than 1 μm | 5% |

The mean statistical gravimetric cleaning efficiency based on the results of ten check measurements was 95%, with an estimated cumulative error from all sources of ±1%. This cleaning efficiency did not vary substantially over the indicated range of flow velocities and dust densities. Furthermore, the fractional composition of the dust collected in the hopper was analyzed, and the results of these measurements indicated, within the precision of the method of analysis, that the fractional composition of the dust in the hopper was essentially the same as that of the incoming dust. This implies that the device also does not substantially affect the fractional composition of the dust in the cleaned portion of the fluid.

EXAMPLE 2

Two of the devices of Example 1 were connected in series. The starting velocities of the gas flows carrying the dust, the starting dust concentrations and the dust fractional composition in the various test runs were the same as in Example 1.

The mean statistical cleaning efficiency based on the results of ten check measurements was 99% ±1%. As in the previous example, the fractional composition of the collected dust was found to be essentially the same as that of the dust at the input end of the first of the two series-connected modules.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

I claim:

1. A device for separating a multiple-component fluid[, preferably for cleaning a gas from] *containing* solid particles, said device comprising:

a truncated cone structure having an axis adapted to extend in the direction of flow of the fluid being separated and including a conical main section defined by a plurality of coaxially aligned rings spaced from one another axially of said cone structure and having, when viewed in the direction of flow of the fluid being separated, progressively decreasing inner diameters, with the ring of largest inner diameter being arranged at the end of said conical main section of said cone structure at which the fluid being separated enters the same and with the ring of smallest inner diameter being arranged at the end of said conical main section of said cone structure at which separated solid particles are discharged; and each of said rings having (a) a highest region, (b) a lowest region, (c) an inside surface which (i) is convexly curved in a radial cross-section along the axis of said cone structure and (ii) extends from an uppermost end at said highest region to a lowermost end at said lowest region of that ring and (iii) faces partly counter to and partly across the direction of flow of the fluid through said cone structure, (d) a bottom surface, and (e) an outside surface, (f) said bottom surface (i) extending from said lowermost end of said inside surface to said outside surface and (ii) facing generally in the direction of the fluid flow through said cone structure and (iii) defining with said inside surface at their juncture a sharp edge which extends circumferentially of said ring and defines said inner diameter of said ring and which is located in said cone structure so that a line parallel to said axis of said cone structure and intersecting said sharp edge of a given ring intersects said inside surface of the next adjacent downstream ring radially outwardly of said sharp edge of that down stream ring, (g) said outside surface extending from said bottom surface to said uppermost end of said inside surface, and (h) the orientation of said bottom surface being such that a tangent thereto at its juncture with said inside surface makes an angle of at most 90° with said axis of said cone structure.

2. A device as claimed in claim 1, wherein said inside surface of each of said rings is so curved that a tangent to that inside surface at its juncture with said bottom surface of the same ring is parallel to said axis of said cone structure.

3. A device as claimed in claim 1 or 2, wherein an inverted conical auxiliary section constituted by at least two additional rings having progressively increasing inner diameters is provided at said cone structure downstream of said smallest ring of said conical main section.

4. A device as claimed in claim 1 or 2, wherein said cone structure is a one-piece unit in the form of a spirally configured strip defining a plurality of turns of progressively decreasing inner diameters, each turn of said spirally configured strip constituting a respective ring of said cone structure and having the prescribed surface and cross-sectional shape characteristics.

5. A device as claimed in claim 1 or 2, wherein:

each of said rings has a radial width measured perpendicularly to said axis of said cone structure between the location of said sharp edge and the location of the juncture of said bottom surface with said outside surface of that ring, and an axial thickness measured parallel to said axis of said cone structure between the plane of said sharp edge and the plane of said highest region of that ring;

said conical main section has an axial height measured parallel to said axis of said cone structure from the plane of said sharp edge of said smallest ring of said conical main section to the plane of said sharp edge of said largest ring; and said rings are arranged so as to define between each upstream ring and the next adjacent downstream ring of said conical main section a gap having an axial height measured parallel to said axis of said cone structure from the plane of said highest region of that downstream ring to the plane of said sharp edge of that upstream ring; and the dimensions of said rings, said gaps and said conical main section of said cone structure satisfy the following relationships:

$$0.5 \leqq w/t \leqq 2$$
$$0.7 \leqq h/t \leqq 3$$
$$10 \leqq D_{max}/D_{min} \leqq 100$$
$$5 \leqq H/D_{max} \leqq 20$$
$$0.02 \leqq \delta/w \leqq 0.8$$

where w is the radial ring width, t is the axial ring thickness, h is the axial gap height, H is the axial main section height, δ is the radial distance between the sharp edge of one of the rings and the sharp edge of the next adjacent ring, $D_{max}$ is the inner diameter of the largest ring, and $D_{min}$ is the inner diameter of the smallest ring.

6. A device as claimed in claim 5, wherein the axial height of said gap between a given upstream ring and the next adjacent downstream ring is equal to the thickness of that upstream ring.

7. A device as claimed in claim 5, wherein said rings are all of equal axial thickness.

8. A device as claimed in claim 5, wherein said rings are all of equal radial width.

9. A device as claimed in claim 5, wherein all of said rings are of equal axial thickness and of equal radial width.

10. A device as claimed in claim 5, wherein the axial thickness and the radial width of all of said rings and the axial height of all said gaps between respective adjacent rings are equal to each other.

11. A device as claimed in claim 1 or 2, wherein a cylindrical auxiliary section constituted by at least two additional rings, the inner diameters of which are equal to the inner diameter of said smallest ring of said conical main section, is provided at said cone structure downstream of said smallest ring.

12. A device as claimed in claim 11, wherein an inverted conical auxiliary section constituted by at least two further rings having progressively increasing inner diameters is provided at said cone structure downstream of the last of said additional rings of equal diameters of said cylindrical auxiliary section.

13. A device as claimed in claim 1 or 2; further comprising a casing having an intake end and an outlet end, said cone structure being mounted in said casing with said largest ring of said conical main section being located proximate to said intake end and being peripherally sealed to the surrounding interior surface of said casing, said intake end of said casing communicating with the interior of said conical main section of said cone structure through said largest ring to enable the fluid to be separated to enter said conical main section, and said outlet end of said casing providing a discharge path from the part of the interior space of said casing which surrounds said cone structure to enable the cleaned portion of the fluid which has exited from said cone structure through said gaps between said rings to leave said surrounding space of said casing, and a hopper having an inlet duct extending into said casing and communicating with the interior of said cone structure through the last of said rings thereof remote from said largest ring, said inlet duct serving to enable particles which have been separated from the cleaned fluid and concentrated by said cone structure, to be discharged with any residual uncleaned fluid from said cone structure and into said hopper for collection of said particles therein.

14. A device as claimed in claim 13, wherein:

each of said rings has a radial width measured perpendicularly to said axis of said cone structure between the location of said sharp edge and the location of the juncture of said bottom surface with said outside surface of that ring, and an axial thickness measured parallel to said axis of said cone structure between the plane of said sharp edge and the plane of said highest region of that ring;

said conical main section has an axial height measured parallel to said axis of said cone structure from the plane of said sharp edge of said smallest ring of said conical main section to the plane of said sharp edge of said largest ring; and said rings are arranged so as to define between each upstream ring and the next adjacent downstream ring of said conical main section a gap having an axial height measured parallel to said axis of said cone structure from the plane of said highest region of that downstream ring to the plane of said sharp edge of that upstream ring; and the dimensions of said rings, said gaps and said conical main section of said cone structure satisfy the following relationships:

$$0.5 \leqq w/t \leqq 2$$
$$0.7 \leqq h/t \leqq 3$$
$$10 \leqq D_{max}/D_{min} \leqq 100$$
$$5 \leqq H/D_{max} \leqq 20$$
$$0.02 \leqq \delta/w \leqq 0.8$$

where w is the radial ring width, t is the axial ring thickness, h is the axial gap height, H is the axial main section height, $\delta$ is the radial distance between the sharp edge of one of the rings and the sharp edge of the next adjacent ring, $D_{max}$ is the inner diameter of the largest ring, and $D_{min}$ is the inner diameter of the smallest ring.

15. A device as claimed in claim 13, wherein an inverted conical auxiliary section constituted by at least two additional rings having progressively increasing inner diameters is provided at said cone structure downstream of said smallest ring of said conical main section, and said inlet duct of said hopper communicates with said inverted conical auxiliary section of said cone structure at the ring of largest inner diameter of said inverted conical auxiliary section.

16. A device as claimed in claim 13, wherein said cone structure is a one-piece unit in the form of a spirally configured strip defining a plurality of turns of progressively decreasing diameters, each turn of said spirally configured strip constituting a respective ring of said cone structure and having the prescribed surface and cross-sectional shape characteristics, and said inlet duct of said hopper communicates with said cone structure at the last turn of said spirally configured strip remote from the largest turn thereof.

17. A device as claimed in claim 13, wherein said smallest ring of said conical main section is said last ring of said cone structure, and said hopper further has means for venting the interior of said hopper to enable fluid, from which particles have settled out in said hopper, to leave said hopper and prevent a build-up of back pressure therein.

18. A device as claimed in claim 17, wherein said venting means comprises a vent pipe extending into said casing and communicating with said space surrounding said cone structure.

19. A device as claimed in claim 13, wherein a cylindrical auxiliary section constituted by at least two additional rings, the inner diameters of which are equal to the inner diameter of said smallest ring of said conical main section, is provided at said cone structure downstream of said smallest ring, and said inlet duct of said hopper communicates with said cylindrical auxiliary section of said cone structure at a terminal ring thereof which is remote from said smallest ring of said conical main section.

20. A device as claimed in claim 19, wherein an inverted conical auxiliary section constituted by at least two further rings having progressively increasing inner diameters is provided at said cone structure downstream of the last of said additional rings of equal diameters of said cylindrical auxiliary section, and said inlet duct of said hopper communicates with said inverted conical auxiliary section of said cone structure at the ring of largest inner diameter of said inverted conical auxiliary section.

* * * * *